United States Patent [19]
Kapsy

[11] 3,961,724
[45] June 8, 1976

[54] FUEL TANK FILLER CAP WITH IMPROVED VENT

[75] Inventor: Robert J. Kapsy, Hartland, Wis.

[73] Assignee: Briggs & Stratton Corporation, Wauwatosa, Wis.

[22] Filed: Mar. 13, 1975

[21] Appl. No.: 557,982

[52] U.S. Cl. .............................. 220/371; 55/186; 220/303; 220/374
[51] Int. Cl.² .................................. B65D 51/16
[58] Field of Search .......... 220/303, 371, 372, 373, 220/374; 210/23 R; 55/186, 185

[56] References Cited
UNITED STATES PATENTS

| | | | |
|---|---|---|---|
| 1,339,485 | 5/1920 | Stranahan | 220/303 |
| 2,298,938 | 10/1942 | Griffin, Jr. et al. | 220/303 |
| 2,565,674 | 8/1951 | Zachlin | 220/374 |
| 2,918,192 | 12/1959 | Dedman | 220/374 |

FOREIGN PATENTS OR APPLICATIONS
736,825  6/1943  Germany ........................... 220/371

Primary Examiner—George E. Lowrance
Assistant Examiner—Allan N. Shoap

[57] ABSTRACT

A fuel tank filler cap with superimposed compartments that are defined from one another by partition walls and filled with fibrous material, the top wall of the uppermost compartment having an air vent and the partition walls having communication ports therethrough, so located with respect to one another and the air vent that communication from the interior of the fuel tank to the air vent through the fibrous material filling the superimposed compartments is so tortuous that the escape of liquid fuel from the tank is virtually impossible, though vapors can freely leave the tank and air can readily enter it.

5 Claims, 3 Drawing Figures

U.S. Patent   June 8, 1976   3,961,724
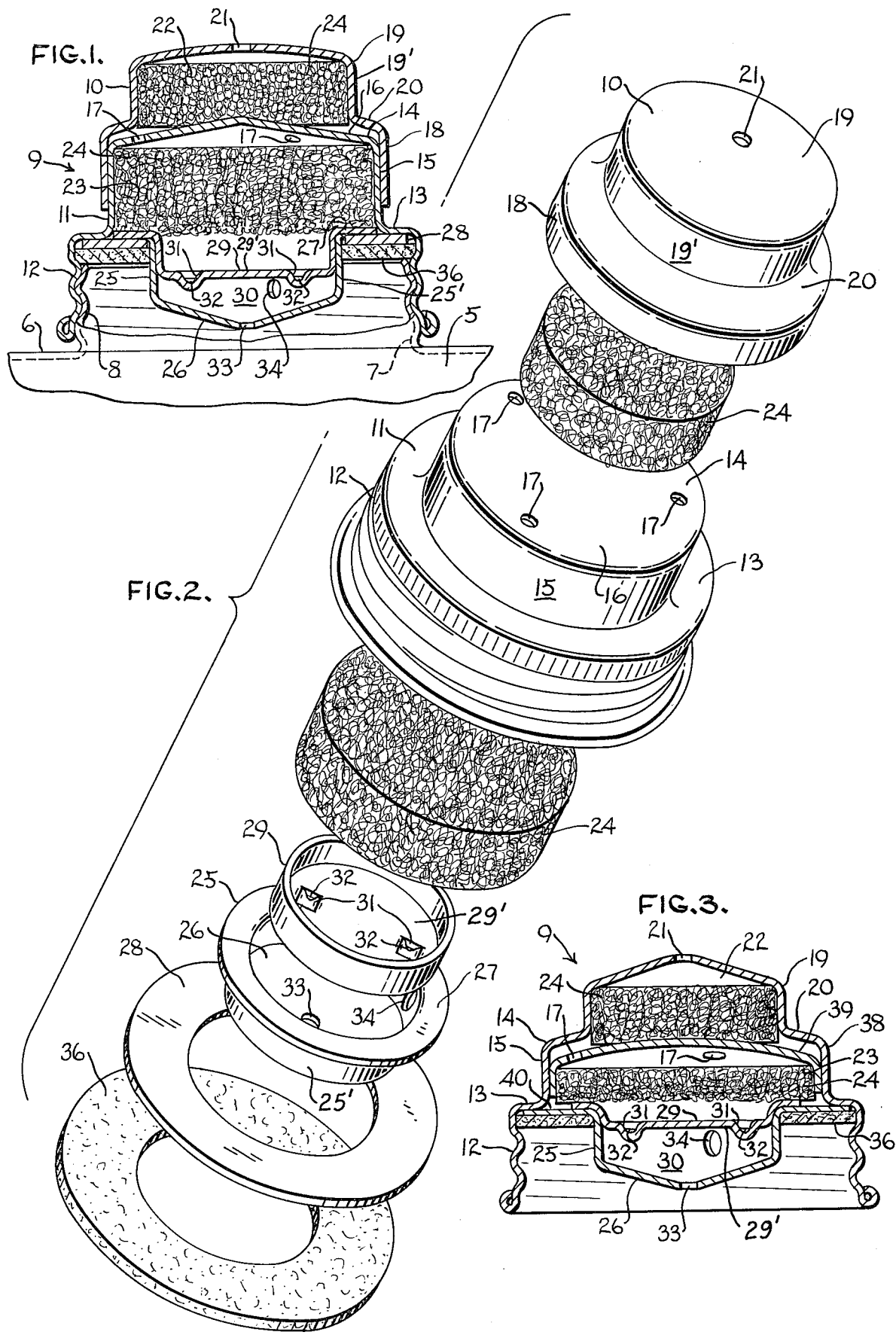

FUEL TANK FILLER CAP WITH IMPROVED VENT

This invention relates to the removable filler caps of fuel tanks on small internal combustion engines used to power lawn mowers and other engine driven lawn and garden equipment. The fuel tanks of such engines must be vented to prevent objectionable vapor pressure in the tank and to enable fuel to flow therefrom. To that end, the cap closing the inlet or filler opening of the tank has an air vent in its top wall. This allows the tank to breathe, but unless the cap is provided with means to keep fuel entrained in the escaping vapor from reaching the vent, liquid fuel will be sprayed from the tank.

The purpose and object of this invention is to provide a vented filler cap for the fuel tanks of small internal combustion engines, so constructed that for all practical purposes liquid fuel is prevented from reaching its vent and being sprayed therefrom.

This same objective has claimed the attention of many prior inventors, whose efforts were rewarded with varying degrees of success; but no one heretofore has been able to fully solve the problem. Notable among the prior attempts to achieve a sprayless vented fuel tank cap is that of the Arndt et al U.S. Pat. No. 3,140,794. While the Arndt et al cap was an improvement over prior vented fuel tank caps, it still left much to be desired. It could not be depended upon to prevent the spraying of fuel through its vent under all circumstances, and especially when the tank was full and the engine was subjected to significant vibration.

The problem is particularly acute on a warm spring day when the gasoline being used still has "built-in" high volatility to improve cold weather starting. Under such circumstances the vapor pressure in the tank is high and the escaping vapor is "wet".

With these observations and objectives in mind, the manner in which the invention achieves its purpose will be appreciated from the following description and the accompanying drawing which exemplify the invention, it being understood that changes may be made in the specific structure disclosed herein without departing from the essentials of the invention set forth in the appended claims.

The accompanying drawing illustrates two complete examples of the embodiments of the invention constructed according to the best modes so far devised for the practical application of the principles thereof, and in which:

FIG. 1 is a longitudinal sectional view through a filler cap constructed in accordance with one embodiment of this invention, illustrating the same in place on a fuel tank, only a fraction of which is illustrated;

FIG. 2 is an exploded perspective view of the cap shown in FIG. 1; and

FIG. 3 is a longitudinal sectional view through a structurally modified form of the filler cap shown in FIGS. 1 and 2.

Referring to the accompanying drawing, the numeral 5 designates a fuel tank representative of those that are mounted on small internal combustion engines, only part of the upper portion of the tank being shown. As is customary in such tanks, its top wall 6 has a filler opening 7 encircled by an upstanding neck 8. This neck is threaded and has the filler cap of this invention, designated generally by the numeral 9, detachably screwed thereon.

In the embodiment of the invention illustrated in FIGS. 1 and 2, the filler cap 9 comprises telescoped upper and lower inverted cup-shaped sections 10 and 11, both of which are sheet metal stampings. The lower section 11 has a stepped diameter side wall, the larger bottom part of which forms an inverted cup-shaped portion that has a cylindrical skirt 12 with threads formed therein to fit the threaded neck 8. Its smaller top part — which is joined to the skirt by a substantially horizontally disposed circular wall or flange 13 — forms a dome 14 with an imperforate cylindrical side wall 15 and a top wall 16 that is arched and has three holes 17 located near its periphery.

The upper section 10 likewise has a stepped diameter with a cylindrical skirt 18 at its bottom and a smaller diameter dome 19 at its top, the side wall 19' of which is joined to the skirt by a circular wall or flange 20. The skirt 18 snugly telescopes onto the dome 14 of the lower section, and the top wall of the dome 19 has a hole 21 at its center. This hole provides the air vent for the cap.

Attention is directed to the overlying relatively closely spaced relationship between the circular walls or flanges 20 and 16 of the upper and lower sections 10 and 11, respectively, and to the fact that the three holes 17 open to the shallow space between these overlying walls. Note also that the arched wall 16 of the lower section forms a partition that coacts with the walls defining the dome 19 and with the imperforate side wall 15 to define superimposed upper and lower compartments 22 and 23 that are communicated with one another only by the holes 17 and the shallow space between the overlying circular walls or flanges 20 and 16.

Both of the superimposed compartments are filled with material 24 which may be of the type often referred to as "rubberized hair", or an open cellular material (either natural or man-made) such as polyurethane foam. To encompass all of the usable possibilities, the material 24 will be referred to hereinafter as "fibrous" material.

Extending across the bottom of the lower compartment 23 is a shallow cup-shaped stamping 25 having a cylindrical side wall 25' with a narrow encircling flange 27 projecting outwardly from its upper edge. The bottom 26 of the cup-shaped stamping is funnel-shaped. A flat ring 28 encircles this cup-shaped stamping and bears against the underside of its flange 27; and a smaller also shallow cup-shaped stamping 29 is seated in and extends across the top of the cup-shaped stamping 25 to coact therewith in the formation of a bottom compartment 30 beneath the aforesaid two superimposed compartments 22 and 23.

At two diametrically opposite locations, the bottom wall 29' of the cup-shaped stamping 29 has depressions 31 formed therein, each of which results in a pair of laterally facing ports 32 that communicate the bottom compartment with the compartment 23 directly thereabove.

There is also a small hole 33 through the center of the funnel-shaped bottom 26 of the cup-shaped stamping and another, somewhat larger hole 34 through the side wall of this cup-shaped stamping, both of which communicate the bottom compartment 30 with the interior of the fuel tank.

An annular gasket 36 tightly fitted to the cup-shaped stamping 25 and likewise tightly fitted into the skirt 12 of the lower section 11 of the cap, provides a leak-proof joint between the lower section of the cap and the assembled parts that extend across the bottom of the compartment 23, so that the only communication between the bottom compartment 30 and the compartment 23 is through the laterally facing ports 32. The gasket 36 also provides a leak-proof connection between the cap and the top edge of the neck 8 on the tank.

Summarizing the foregoing description, the telescoping upper and lower sections 10 and 11, both of which are sheet metal stampings, coact to form a pair of superimposed compartments 22 and 23 that are filled with fibrous material and communicated with one another only through the three holes 17 and the shallow annular space into which they open. The lower section 23 is closed at its bottom by the assembled parts that form the bottom compartment 30 which communicates with the compartment 23 only through the laterally opening ports 32, and which opens to the fuel tank through the side hole 34 and the smaller drain hole 33.

By virtue of this structural relationship, communication between the tank interior and the air vent follows a most tortuous path, extending as it does through the laterally opening ports 32 in the top of compartment 30, then through the fibrous material filling the lower compartments 23 to the holes 17 and the shallow annular space into which these holes open and which leads to the upper compartment 22, then through the fibrous material that fills that compartment to finally reach the air vent 21. While the tortuous nature of the path defined by the assembled metal parts of the cap contributes significantly to the desired assurance that liquid fuel entrained in the escaping vapor — or otherwise reaching the air vent — will not by sprayed out of the vent, it is the fibrous material filling the compartments 22 and 23 that enables this invention to reliably attain its objective where prior attempts to do so failed. Why this is so is not entirely understood, but it is known that without the fibrous material filling the compartments 22 and 23, the cap cannot be depended upon to prevent liquid fuel being sprayed from its vent.

Any liquid fuel that accumulates in the several superimposed compartments will collect in the bottom compartment when the engine stops and will drain therefrom through the drain hole 33.

The embodiment of the invention illustrated in FIG. 3 has the same arrangement of compartments and communication ports as that of FIGS. 1 and 2, as evidenced by the use of the same reference numerals to identify these parts. However, the specific construction is different. Thus, instead of having the outer walls of the superimposed compartments 22 and 23 formed by two separate sections, in this instance they are formed by a single stamping 38 which also provides the threaded skirt 12 by which the cap is detachably secured to the fuel tank. The partition dividing the superimposed compartments 22 and 23 from one another is formed by an inverted cup-shaped stamping 39 telescoped into the stamping 38; and in lieu of the three-part assembly that closes the underside of the bottom compartment 30 in FIGS. 1 and 2, there are only two parts since a flange 40 that is integral with the cup-shaped stamping 25 eliminates the need for the separate ring 28.

Those skilled in the art will appreciate that the invention can be embodied in forms other than as herein disclosed for purposes of illustration.

The invention is defined by the following claims.

I claim:

1. A fuel tank cap having an air vent through which vapor can leave and air can enter the tank and means to prevent liquid fuel in the tank from being expelled through the air vent, comprising:

A. an inverted cup-shaped portion adapted for detachable connection to the neck of a fuel tank inlet;
B. walls fixed with respect to said inverted cup-shaped portion defining at least two superimposed coaxial substantially cylindrical compartments above the top of said inverted cup-shaped portion, and a bottom compartment beneath said superimposed compartments,
   each of said compartments having a side wall and said bottom compartment also having a bottom wall which together with its side wall separates the bottom compartment from the interior of the inverted cup-shaped portion;
C. the upper one of two of said directly superimposed compartments being smaller in diameter than the lower one and its side wall having a flange projecting laterally outward from its lower marginal edge;
D. the wall that separates said directly superimposed compartments having its peripheral portion underlying said laterally projecting flange and being spaced therefrom a short distance to form a shallow annular space which communicates with the upper one of said directly superimposed compartments;
E. port means in said peripheral portion of the wall that separates said directly superimposed compartments communicating the lower one of said compartments with said shallow annular space and forming the only communication between said directly superimposed compartments;
F. the wall separating the lowermost one of said superimposed compartments from the bottom compartment having port means spaced from the common axis of said compartments through which the compartments at the opposite sides of said wall are communicated;
G. port means in a wall of said bottom compartment communicating the same with the interior of the fuel tank on which the cap is mounted;
H. a centrally located port in the top of the uppermost of said superimposed compartments; and
I. fibrous material filling said superimposed compartments.

2. The fuel tank cap of claim 1, wherein said port means recited in paragraph F is in the side of a downward depression in the wall identified in said paragraph.

3. The fuel tank cap of claim 1, wherein said bottom compartment is partially defined by a cup-shaped member having a cylindrical side wall and a funnel-shaped bottom wall, and
   wherein said port means recited in paragraph G comprises a hole in said side wall and another hole at the center of said funnel-shaped bottom wall.

4. The fuel tank cap of claim 1, wherein there are two superimposed compartments filled with fibrous material, and
   wherein said inverted cup-shaped portion and the outer walls of said superimposed compartments are one unitary member.

5. The fuel tank cap of claim 1, wherein there are two superimposed compartments filled with fibrous material, and
   wherein said inverted cup-shaped portion and the wall that separates the superimposed compartments are one integral dome-shaped sheet metal stamping while the upper compartment is defined by a second dome-shaped sheet metal stamping telescoped onto the upper portion of the first mentioned dome-shaped stamping.

* * * * *